US010442125B2

(12) United States Patent
Franksson et al.

(10) Patent No.: US 10,442,125 B2
(45) Date of Patent: Oct. 15, 2019

(54) INJECTION MOLD, MOLDING TOOL COMPRISING THE MOLD AND METHODS OF USE THEREOF

(71) Applicant: PLASTICS UNBOUND GMBH, Zürich (CH)

(72) Inventors: Olof Franksson, Danderyd (SE); Robert Axelsson, Gränna (SE)

(73) Assignee: PLASTICS UNBOUND GMBH, Zürich (CH)

( * ) Notice: Subject to any disclaimer, the term of this patent is extended or adjusted under 35 U.S.C. 154(b) by 515 days.

(21) Appl. No.: 15/139,978

(22) Filed: Apr. 27, 2016

(65) Prior Publication Data

US 2016/0236391 A1    Aug. 18, 2016

Related U.S. Application Data

(63) Continuation of application No. PCT/EP2014/073707, filed on Nov. 4, 2014.

(30) Foreign Application Priority Data

Nov. 4, 2013  (EP) ..................................... 13191336
Mar. 28, 2014  (EP) ..................................... 14162238

(51) Int. Cl.
  *B29C 45/73*   (2006.01)
  *B29C 45/76*   (2006.01)
  (Continued)

(52) U.S. Cl.
  CPC ...... *B29C 45/7312* (2013.01); *B29C 35/0294* (2013.01); *B29C 45/1756* (2013.01);
  (Continued)

(58) Field of Classification Search
  CPC . B29C 35/0294; B29C 45/7312; B29C 45/73; B29C 45/32; B29C 45/7626;
  (Continued)

(56) References Cited

U.S. PATENT DOCUMENTS 3,181,200 A    5/1965  Joseph
3,974,857 A *  8/1976  Hehl ....................... B29C 45/72
                                                          137/559

(Continued)

FOREIGN PATENT DOCUMENTS

DE    1 938 496 A1    2/1971
DE    23 31 426 A1    1/1975
  (Continued)

OTHER PUBLICATIONS

International Search Report, PCT/EP2014/073707, dated Feb. 27, 2015.

(Continued)

*Primary Examiner* — Joseph S Del Sole
*Assistant Examiner* — Ninh Le
(74) *Attorney, Agent, or Firm* — Winston & Strawn LLP

(57) ABSTRACT

An injection mold that has an injector mold plate with a first injector mold plate face and an opposite second injector mold plate face, an ejector mold plate having a first ejector mold plate face and an opposite second ejector mold plate face, with the first injector mold plate face faces the first ejector mold plate face, at least one tempering medium channel connecting a tempering medium inlet of the injection mold to a tempering medium outlet of the injection mold, wherein the at least one tempering medium channel traverses an area of at least one of the second injector mold plate face and/or the second ejector mold plate face and defines a free opening in the respective mold plate face along at least a length of the at least one tempering medium channel.

16 Claims, 7 Drawing Sheets

Figure 1:
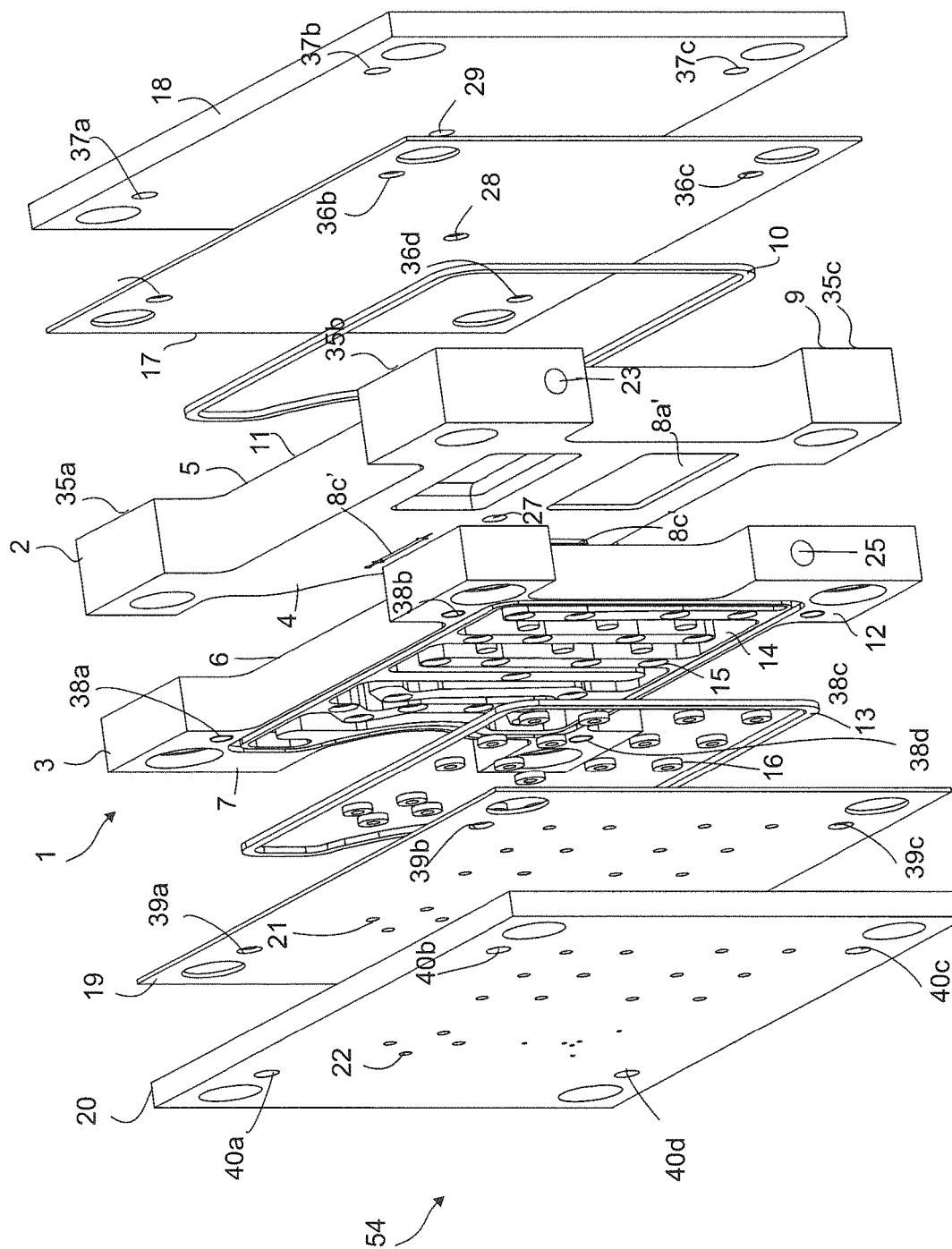

(51) Int. Cl.
    *B29C 45/40*     (2006.01)
    *B29C 45/32*     (2006.01)
    *B29C 45/26*     (2006.01)
    *B29C 45/27*     (2006.01)
    *B29C 45/17*     (2006.01)
    *B29C 35/02*     (2006.01)
    *B29C 33/04*     (2006.01)

(52) U.S. Cl.
    CPC ...... *B29C 45/2642* (2013.01); *B29C 45/2673* (2013.01); *B29C 45/2675* (2013.01); *B29C 45/2737* (2013.01); *B29C 45/32* (2013.01); *B29C 45/401* (2013.01); *B29C 45/73* (2013.01); *B29C 45/7306* (2013.01); *B29C 45/7626* (2013.01); *B29C 2033/042* (2013.01); *B29C 2045/4015* (2013.01); *B29C 2045/7356* (2013.01); *B29C 2045/7393* (2013.01)

(58) Field of Classification Search
    CPC ............ B29C 45/2673; B29C 45/2675; B29C 45/401; B29C 45/1756; B29C 2045/7318; B29C 2045/2683; B29C 2045/4015; B29C 2045/4094; B29C 2045/7393; B29C 2045/7325; B29C 2033/042; B29C 45/2737; B29C 45/7306; B29C 45/7337; B29C 45/78; B29C 45/2642; B29C 35/041; B29C 35/045; B29C 35/049
    See application file for complete search history.

(56) References Cited

U.S. PATENT DOCUMENTS

| | | | |
|---|---|---|---|
| 4,462,780 | A | 7/1984 | Stavitsky et al. |
| 5,744,173 | A | 4/1998 | Sterett |
| 5,944,087 | A | 8/1999 | Sterett |
| 6,290,882 | B1 | 9/2001 | Maus et al. |
| 2007/0286918 | A1* | 12/2007 | Crain ..................... B29C 33/74 425/175 |
| 2012/0053718 | A1 | 3/2012 | Grimm |
| 2013/0004698 | A1 | 1/2013 | Stillwell et al. |

FOREIGN PATENT DOCUMENTS

| | | | |
|---|---|---|---|
| DE | 30 17 559 | A1 | 11/1981 |
| DE | 92 01 642 | U1 | 7/1992 |
| DE | 10 2006 008 359 | A1 | 8/2007 |
| GB | 2478796 | A | 9/2011 |
| JP | 59-232808 | A | 12/1984 |
| JP | 03-246013 | A | 11/1991 |
| JP | 10-29215 | | 2/1998 |
| JP | 10-029215 | A * | 3/1998 |
| JP | 2010-36588 | A | 2/2010 |
| WO | 94/13454 | A1 | 6/1994 |
| WO | 97/31733 | A1 | 9/1997 |
| WO | WO97/31733 | * | 9/1997 ............... B22C 9/00 |
| WO | 00/74922 | A1 | 12/2000 |
| WO | 03/011550 | A2 | 2/2003 |
| WO | 03/031149 | A1 | 4/2003 |
| WO | WO 2010/127990 | A1 | 11/2010 |
| WO | WO 2012/055872 | A1 | 5/2012 |
| WO | WO 2013/126723 | A1 | 8/2013 |

OTHER PUBLICATIONS

International Preliminary Report on Patentability, PCT/EP2014/073707, dated Feb. 23, 2016.
International Search Report, PCT/EP2014/073688, dated Apr. 1, 2015.
International Preliminary Report on Patentability, PCT/EP2014/073688, dated Jan. 14, 2016.
Bank, "Why Plastic Flows Better in Aluminum Injection Molds," XP-002722375, pp. 1-8 (2008). www.alcoa.com/mold/en/pdf/spiral_report.pdf.
Knights, "Hot/Cold Thermal Cycling of Injection Molds Heats Up," Plastics Technology, pp. 1-4 (2010). www.ptonline.com/articles/hot-cold-thermal-cycling-of-injection-molds-heats-up.
Lammon, "Dispelling Aluminum Tooling Myths," XP-002722374, pp. 1-4 (2010). www.moldmakingtechnology.com/articles/dispelling-aluminum-tooling-myths.
Naitove, "'Passive Variotherm' Cooling Cuts Cycle Time at Low Cost," Plastics Technology, pp. 1-2 (2015). www.ptonline.com/articles/passive-variotherm-coolilng-cuts-cycle-time-at low-cost.
Ridder et al., "The Possibilities and Limitations of Variable Mold Temperature Control," XP-008113016, Kunstsoffe International, pp. 22-29 (2009).
Xie et al., "A novel approach to realize the local precise variotherm process in micro injection molding," Microsyst Technol., pp. 1-7 (2012).
"Flowing Hot and Cold Brings Product Improvement," Free Online Library, pp. 1-5 (2009). www.thefreelibrary.com/Flowing+hot+and+cold+brings+product+improvement.-a0201368793.

* cited by examiner

INJECTION MOLD, MOLDING TOOL COMPRISING THE MOLD AND METHODS OF USE THEREOF

CROSS-REFERENCE TO RELATED APPLICATIONS

This application is a continuation of International Patent Application PCT/EP2014/073707 filed Nov. 4, 2014, which claims the benefit of European patent applications nos. 14162238.1 filed Mar. 28, 2014 and 13191336.0 filed Nov. 4, 2013. The content of each prior application is expressly incorporated herein by reference thereto.

BACKGROUND

The present invention relates to an injection mold comprising an injector mold plate having a first injector mold plate face including first mold cavities halves of one or more mold cavities and an opposite second injector mold plate face to be mounted to an injection molding tool, an ejector mold plate having a first ejector mold plate face including second mold cavities halves of one or more mold cavities and an opposite second ejector mold plate face to be mounted to an injection molding tool, the first injector mold plate face faces towards the first ejector mold plate face to delimit one or more mold cavities when the injector mold plate and the ejector mold plate are in closed contact during injection of a plastic material, and at least one tempering medium channel that connects at least a tempering medium inlet of the injection mold to a tempering medium outlet of the injection mold.

International patent application no. WO2013/126723 includes a discussion of conventional cooling systems for injection molding machines. The cooling system accelerates cooling of the molded parts by circulating a cooling fluid through the mold, thereby allowing the machine to complete more cycles in a given amount of time, which increases production rates and thus the total amount of molded parts produced. It is emphasized that these cooling systems add complexity and costs to the injection molds, a.o. because of costly designing of complex hole patterns, drilling long holes in 3D, manually plugging holes, many setups in different directions, and because high hardness mold materials are difficult to machine. Leakage of cooling fluid must not take place during the injection molding cycle. So in order that cooling fluid does not leak to the exterior of the mold cooling channels are conventionally made by drilling holes in the support plates, thus cooling channels are straight and embedded, and only a limited number of criss-crossing cooling channels, optionally in several planes, are possible within the thickness of a base plate or support plate for an injection mold. Moreover, it is impossible to approximate the distance so that said distance is substantially uniform to all mold cavities of an injection mold.

Accordingly, drilling of cooling channels through the base plate or support plate is difficult, time consuming, and expensive. Moreover, cooling channels can only be drilled in a straight line, resulting in that critical hotspots often remain out of reach of the cooling/heating medium and therefore cannot be mitigated. These practical limitations in drilling cooling channels result in unequal cooling within the injection mold which has consequences on the quality of the molded part.

WO 2003/011550 discloses various mold assemblies having a plurality of cooling lines machined in a support plate to facilitate injection molding thin-walled parts without the thinness of the flow channel cools the molten thermoplastic material before this material reaches the end of the flow channel and fills the cavity completely. This known injection mold has an integrated shell that is constructed of both a surface layer of the mold cavity with low thermal mass and an insulation layer which is located on the surface of the reverse side of the surface layer and comprises microchannels or micro-holes. Heating of the cavity surfaces during injection of thermoplastic material takes place by induction heating, and subsequent cooling of the molded part is obtained by circulating a cooling fluid through a cooling line installed in the mold base or through the micro-channels constructed in the insulation layer. To minimize risk of leakage of cooling fluid the microholes and micro-channels are internal bores, as in any other conventional injection mold, and only a limited amount of cooling fluid can be circulated. It is proposed without any technical teaching and indication of means that heating also can take place through the drilled bores by circulating a fluid at high temperature through a cooling line or the micro-channels.

In summary, in the above conventional injection molding systems using cooling channels, such cooling channels are integral bores through which a minimum of cooling fluid can pass at a limited speed to reduce potential leakage. Thus, in such cases, although the conventional cooling methods enable fast production compared to conventional injection molding methods not applying active cooling, the cooling process still needs to be made more effective, e.g. to injection molding complex parts, including thin parts, as well as for improving production rates, minimize costs and deliver high quality.

WO9731733 relates to a casting process to make cavity and core inserts for injection molding tools. These inserts are cast with a fluid circulator system that moves or pulls a cooling fluid into a cooling chamber on the backside of the inserts. The cooling fluid is subjected to a negative pressure to rapidly pull the cooling fluid through the chamber. The cooling fluid is agitated around support pillars provided in the chamber to provide strength to the inserts.

An alternative embodiment of a cooling chamber of WO9731733 has support means comprising a plurality of congruent wall sections, which axially extend from the front side of an insert. The support wall sections are symmetrically positioned in the chamber so when the plastic material is injected into the cavity area there is more support where the plastic material is under the high injection pressure. During operation of the molding apparatus outside pressure bearing means act to absorb or bear the brunt of the high pressure exerted against the core insert and the cavity insert. The pressure bearing means have a height slightly longer or taller than the combined depth of the core insert and the cavity insert such that most of the molding pressure is absorbed by said pressure bearing means so as to reduce stress or pressure put on the inserts to force the melt to distribute inside the one or more mold cavities. So WO9731733 produces injection molds for high pressure applications without heating the mold. Further these injection molds are cast on a model of the plastic part in a two-step process where the molding cavities are formed during casting. Such molded cavities are however rarely molded to correct size since the cast metal material shrinks substantially during hardening. In particular the copper proposed in WO9731733 has high shrinkage compared to aluminum and gray steel.

The support wall sections define a flow chamber of channels all of which in mutual fluid-connection via traverse openings. As a cooling fluid is pulled through the open chamber, the flow of the fluid is disturbed as it passes around the support pillars and/or wall sections and allows water to flow wherever it finds the shortest way, thus the flow path of the water cannot be controlled. The flow path is arbitrary if negative pressure is applied, so the flowpath is as directly as possible from a cooling fluid inlet to a cooling fluid outlet.

WO9731733 does not propose to use the cooling chamber for heating the mold cavities as well, and thus have no need for any kind of insulation to administer thermal energy.

There is thus still a need within the art of injection molding to get cheaper and simpler manufacturing of the tempering arrangements for the injection mold, and to optimize heat exchange between plastic material and injection mold during a molding cycle to obtain short cycle time, thus increased productivity, as well as molding plastic products of high quality.

SUMMARY OF THE INVENTION

In a first aspect according to the present invention is provided an injection mold of the kind mentioned in the opening paragraph, which allows improved and uniform heat dissipation and heat exchange between the plastic material in a mold cavity and a tempering medium.

In a second aspect according to the present invention is provided an injection mold of the kind mentioned in the opening paragraph for injection molding plastic parts of high quality and dimensional accuracy at higher speed than conventional injection molding machines.

In a third aspect according to the present invention is provided an injection mold of the kind mentioned in the opening paragraph, in which thermal stress in the mold is reduced.

In a fourth aspect according to the present invention is provided an injection mold of the kind mentioned in the opening paragraph, in which critical hotspots are tempered effectively.

In a fifth aspect according to the present invention is provided an injection mold of the kind mentioned in the opening paragraph, which is not restricted for use in a particular injection molding machine design or injection molding machine set up.

In an sixth aspect according to the present invention is provided an injection mold for which the means for tempering the injection mold are simple to design and operate, and can be manufactured simple, fast, and cheap, without the need of specially made tools and equipment.

In a seventh aspect according to the present invention is provided an injection molding machine of the kind mentioned in the opening paragraph, which can be fitted with different injections molds of the invention while using same exterior tempering system and tempering arrangement.

In a eighth aspect according to the present invention is provided an injection molding machine of the kind mentioned in the opening paragraph, which has heat exchange properties between tempering medium and injected material.

In an ninth aspect according to the present invention is provided an injection molding machinery of the kind mentioned in the opening paragraph, in which the injection mold can be cooled and heated alternately during an injection molding cycle.

The novel and unique whereby these and other aspects are solved according to the present invention consist in that the injection mold comprises that the at least one tempering medium channel defines a flow path, that runs above one or more of the one or more mold cavities by traversing an area of at least one of the second injector mold plate face and/or the second ejector mold plate face, the at least one tempering medium channel defines a free opening in said respective second mold plate face along at least a length of the at least one tempering medium channel, which free opening becomes closed when the injection mold is mounted to when the injection mold is mounted in an injection molding machine.

Within the context of the present invention the term "injector mold plate" is the mold half from which injection of molding material takes place, thus the "injector mold plate" is the "injector mold half" and these terms shall be understood as being interchangeable.

Within the context of the present invention the term "ejector mold plate" is the mold half from which ejection of a molded part takes place after sufficient solidification, thus the "ejector mold plate" is the "ejector mold half" and these terms shall be understood as being interchangeable.

The "ejector mold plate" is often called "the mold core" and the injector mold plate called "the mold cavity". In order that the conventional terms are not construed as limiting the scope of the present invention to arrangements of cores and cavities, the more general terms are used throughout the present application. Thus it should be understood that cavities and/or cores can be both in the injector mold plate and in the ejector mold plate as the tool designer finds expedient for a given injection mold in a given injection molding process.

The injector mold half and the ejector mold half together delimit the "one or more mold cavities" when the injection mold is closed, thus when the second mold plate faces forcibly contact.

The term "tempering medium" is used for a fluid selected from gases or liquids suited to transport thermal energy, such as to hold a selected temperature for a time suitable to exchange thermal energy with at least the injection mold material, e.g. to heat the injection mold prior to and/or during injection of plastic material.

The tempering medium circulating in the at least one tempering medium channel of the injection mold can preferably be an oil, such as an mineral oil, although other fluid tempering media, being liquids, such as water, or gases, also are contemplated by the present invention. The suitable tempering media are selected to have a heat capacity sufficient to carry thermal energy to at least the mold cavities and from at least the molded part, respectively, to manufacture molded parts at high speed without compromising physical and mechanical properties of the final molded part. The skilled person is aware that tests and trials may be needed to establish optimum process parameters for a given injection molding task. The tempering medium may be the same or different for heating and cooling, e.g. an oil for heating and water for cooling. The tempering medium may circulate in separate circuits for the injector mold plate and the ejector mold plate, and may even be different for these plates. Whether or not both the injector mold plate and the ejector mold plate are tempered, in which order, at which speed, the kind of tempering medium channel are selected, etc. depends on the given task.

Thermoplastic materials are particularly suited for being molded in the injection mold according to the present invention. Thermosetting plastics are however not excluded.

The at least one tempering medium channel according to the present invention has a lengthwise free opening in a respective second mold plate face (i.e. the plate backside) and a depth inside the respective mold plate towards one or more cavities in a respective first mold plate face (i.e. the plate front side). This way, it is possible to provide a tempering medium channel that allows the tempering medium to get close to a mold cavity, e.g. equally close to any curvature of a mold cavity, if this is expedient. The free opening can as an example be made by simple, fast, and cheap milling, and the depth of the tempering medium channel can be the same or different along the flow path. It can e.g. be expedient to make the at least one tempering medium channel with a depth so that the distance between the at least one tempering medium channel and an opposite mold cavity is approximately the same at selected locations or at all locations. This way good heat exchange can be obtained at all locations of a mold cavity surface. Since the at least one tempering medium channel is made as an open furrow in a second mold plate face, and not as a closed bore from a short edge of another support plate than the injector mold plate or ejector mold plate, as in conventional injection molds, the at least one tempering medium channel can traverse a respective plate face in any random way, not just be composed of straight channels as in the prior art injection molds. By making tempering medium channels in both the injector mold plate and the ejector mold plate tempering can be done from both mold halves, thereby affecting molding cycle time and molding cycle rate as desired.

The art of making an injection mold has hitherto aimed to defend structural integrity of the injection mold and not to make the mold vulnerable to deformation upon application of forces when opening and closing the injection mold, or during injecting plastic material. This aim is met by not removing more solid material from the mold halves than absolutely necessary, so the skilled conventional injection mold halves maker is prejudiced from removing mold material other than during milling of the mold cavities. Cooling channels are therefore normally made by drilling holes in cooling plates or support plates of the injection molding machine, which cooling plates or support plates are directly or indirectly attached to the mold halves for cooling those. Also, conventional cooling is limited to be made from the injection plate because insertion of extra cooling plates in front of the ejector mold plate is impossible due to the reciprocating ejector pins.

In an expedient embodiment the at least one tempering medium channel may have a free opening along the entire length of the at least one tempering medium channel. This way the entire opening can be inspected immediately when the mold plate is demounted from the injection molding machine to detect macro or micro cracks, fissure and flaws by the eye or using a microscope.

According to the present invention the free opening is first closed when the injection mold is fitted on the injection molding machine, so as to create a closed and efficient flow path for circulation of the tempering medium, which flow path can, if convenient, be given a much larger cross-sectional area than possible in conventional cooling channels for injections molds. So very large volumes of tempering medium can pass through this novel at least one tempering medium channel, which makes heat dissipation and cooling exceptionally fast and effective.

In a preferred embodiment the at least one tempering medium channel is a continuous chicane extending from an tempering medium inlet to a tempering medium outlet, which continuous chicane consists of a series of tight flow path turns separated by intermediate channel walls that direct the tempering medium in opposite flow directions. Such a well-defined flow path minimizes undesired effects such as turbulence and agitation that might make it difficult to control residence time of a tempering medium inside a tempering medium channel, and induce corrosion and erosion that may make the thin wall between a mold cavity and a tempering channel vulnerable to rupture due to pitting and cracks coming from contact with the tempering medium or from clamping forces or injection pressures inside cavities or runners. The provision of a tempering medium channel as a continuous chicane of tight turn, such as turns turning the flowpath 180°, serves to direct the tempering medium in controlled manner from inlet to outlet without any regions of the tempering channel, and thus the mold metal material, being subjected to critical higher pressures and thermal exchanges than other regions. The preferred injection pressure of the present invention is an injection pressure below 100 kg/m², which is about 15% of the high pressure of most conventional applications not making use of heating the injections mold.

Preferably at least some of the intermediate channel walls are parallel.

As stated above the one or more mold cavities may advantageously be delimited by the injector mold plate and the ejector mold plate when the first injector mold plate face and the first ejector mold plate face contact each other in the closed position of the injection mold. As mentioned to temper the one or more mold cavities the at least one tempering medium channel advantageously defines a flow path, that runs above said one or more mold cavities defined by cavity parts and/or halves in one or both of the contacting mold plates.

A highly efficient injection mold includes that each of the injector plate or the ejector plate has one or several tempering channels, which each is a single continuous chicane of tight turns defined by channel walls and has a lengthwise opening along its entire length, which opening is first closed when said plates are mounted to the injection molding tool. The tempering process can be achieved at its optimum when both the injector mold plate and the ejector mold plate are provided with both tempering channels and mold cavity parts in which case tempering can be done simultaneously and equally from both second faces. Cores and cavities of the one or more mold cavities may be in one or both of the injector mold plate and the ejector mold plate. Tempering can be done irrespective of whether the injection mold is open or closed, and one or both mold plates can have tempering medium channels.

In a preferred embodiment the injector plate has one single continuous first tempering channel and the ejector plate has one single second continuous second tempering channel to provide the ultimate guidance and residence time of first and second tempering medium, which first and second tempering medium is the same or different, as well as optimum thermal transfer through wall between the bottom of the channel and all the mold cavities.

The one single continuous first tempering channel and the one single second continuous second tempering channel may both be chicanes of tight turns, preferably turns about 180°.

Alternatively just one of the injector plate or the ejector plate has one tempering channel being a single continuous chicane of tight turns having an opening along its entire length.

Because the at least one tempering medium channel is made in a mold plate it can always be ensured that heat exchange, cooling as well as heating, is optimally adapted to and fits the best for specific plastic parts to be molded. This is not the case using the standard cooling of the conventional injection mold, wherein the same drilled cooling bores in a separate plate, secured to the injection mold, are used for cooling different mold halves and different mold cavities.

In an expedient embodiment the at least one tempering medium channel is a chicane, preferably a continuous chicane, defining a flow path for circulation of the tempering medium across a mold plate, which at least one tempering medium channel defines a flow path that is longer than the width of the respective injector mold plate or ejector mold plate, and/or the height of the respective injector mold plate or ejector mold plate, and/or any line from edge to edge or corner to corner of the respective injector mold plate or ejector mold plate.

The chicane is a series of tight turns, legs, of the tempering medium channel in opposite directions compared to an otherwise straight stretch of a flow path of the drilled bores of the conventional cooling channels. The chicane provides a longer flow path across a plane than a straight bore and traverses a much larger area of a respective mold plate than possible with just straight bores as cooling channels in extra base plates or support plates, as used in conventional cooling systems for injection molding machines. Time for heat exchange between a quantity of tempering medium, injected plastic material in a mold cavity, and mold halves is prolonged due to the extra length confer longer residence time, thereby improving said heat exchange. The width of the flow path, thus the width of the chicane, can also be made wider than possible with straight drilled bores and be made with different widths along the length of the at least one tempering medium channel. Since the injected plastic material flows substantially by itself into any corner of a mold cavity it is possible to mold many different complex plastic parts using same mold plates. Although cycle time might be a bit longer, the total number of plastic parts produced compared to conventional high pressure not-tempered injection molds making one part fast at a time, is substantially higher.

The tempering medium can be circulated through the at least one tempering channel, i.e. through the legs or turns of the chicane, e.g. 180° turns, optionally in response to opening and closing one or more valves of a valve system.

The tempering medium channel may have an inlet and an outlet positioned where appropriate, e.g. terminating at an edge of a mold plate. The mold plate may e.g. have a peripheral area without open tempering medium channel to provide a rim for sealing and securing to the remaining machinery and for accommodating a tempering medium inlet and/or outlet.

In particular embodiments the second injector mold plate face of the injector mold plate can have a first peripheral area encircling at least one first tempering medium channel and being provided with a first seal, and/or the second ejector mold plate face can have a second peripheral area encircling at least one second tempering medium channel and being provided with a second seal. These first seal and/or second seal serve to prevent leakage between the mold plate and a plate which are clamped to the mold plate, injector mold plate or ejector mold plate, to close the free opening of the associated tempering medium channel to create the flow path for the tempering medium.

The at least one first open tempering medium channel of the injector mold plate is closed by a first sealing plate and the at least one open second tempering medium channel of the ejector mold plate is closed by a second sealing plate, and the first seal and the second seal, respectively serve to make the connection fluid tight when tempering medium circulates along the legs of the pathways of the tempering medium channels, thus flowing alternate along subsequent channel legs in opposite directions from inlet to outlet. So the channels wall extends from the bottom of a tempering channel to the respective sealing plate so that no tempering fluid can pass below the sealing plate. The tempering medium must follow the curvature of a tempering medium channel.

In order to eject the molded cooled part the ejector mold plate has a plurality of traverse passages for ejector pins. A traverse passage for an ejector pin may have a passage seal to prevent tempering medium from penetrating into the one or more mold cavities, including when ejection of a molded part takes place. A passage seal may be of the kind that is able to contract or be compressed to allow access and axial movement of a reciprocating ejector pin, and to expand to completely fill out and seal the entire diameter of a traverse passage in the unfortunate event that an ejector pin is fully retracted from the traverse opening. An ejector pin can extend more or less into a traverse passage at any time to contribute to sealing. Thus during injecting a shot of plastic material, e.g. a thermoplastic, the free end of the injector pin is nested in retracted position in proximity of the surface of the molded part. Together with the passage seal the diameter of the ejector pin sealingly plugs its corresponding traverse opening. A passage seal encircles the reciprocating ejector pin both when the ejector pin is moved forward to eject the cooled molded plastic part and when the ejector pin is retracted to prepare for a new injection cycle.

When the thickness of the goods of the injector mold plate or of the ejector mold plate between a mold cavity and a tempering medium channel is small heat dissipation rate is easier to control, e.g. to be substantially the same at most of the mold cavity surface, or even at almost the entire mold cavity surface, closest to the tempering medium channel and tempering medium channel walls. If the tempering medium channel walls have substantially the same thickness as the mold cavity walls, the mold cavities can be heated and/or cooled similarly from two sides, and heated and/or cooled twice as fast as the mold cavity walls. Since the plates accommodating the tempering medium channels can be tempered evenly and to substantially same degree all over plate surface, heating up and/or cooling down the mold cavities are very homogenous and controlled.

The at least one tempering medium channel can simply be obtained by machining from a respective second mold plate face a solid injector mold plate or a solid ejector mold plate, respecting the actual locations of the one or more mold cavities. Roughing milling can e.g. be used in a rapid and cheap action in one milling machine set-up of a mold plate for creating one or more tempering medium channels. The design of a tempering medium channel can be tailored to the specific mold cavity of a plastic part. Should a plastic part be made with sections of higher thickness, that requires a different degree of tempering than the remainder of the plastic part, equal heat exchange can be obtained by proper selection during machining of the depth of the at least one tempering medium channel above the respective sections. For some mold plates the one or more mold cavities and the at least one tempering medium channel can be made using same equipment for machining.

The thickness of the goods of the injector mold plate or of the ejector mold plate between a cavity and a tempering medium channel may vary but is preferably small since the injection pressure can be kept low due to the heating of the mold plates keeps the plastic material fluid and viscous until cooling starts.

For example in case that the at least one tempering medium channel is obtained by machining a solid mold plate as suggested above a thickness of the goods of the mold plate between a cavity and a tempering medium channel may be less than 20 mm or even less than 15 mm. Heat exchange can thus take place rapidly so that production rate can be kept as high as possible without making a compromise of high quality. In particular thin parts can be cooled very uniformly by bringing the tempering medium that close to the mold cavity, thereby minimizing the number of potential hot-spots.

The inventors of the present invention have done tests to establish that optimum performance of the injection mold is achieved if the at least one tempering medium channel includes one or more features of:

a channel leg turning radius between 6.0-30 mm,
a number of channel legs between 3-10,
a channel leg having a length about 200 mm,
a total length between 600-800 mm,
a depth between 20-60 mm,
a channel leg having a width between 3.0-5.0 mm,
a channel leg thickness between 3.5-5.0 mm, or
a thickness of metal goods between channel and the one or more mold cavities of 3.0-5.5 mm.

In terms of ease of machining the at least one tempering medium channel it has further been established that satisfactory results cam be achieved by an injection mold having a tempering medium channel that includes one or more features of:

a channel leg having a length of about 140 mm,
five channel legs,
a total length of between 700 mm,
a depth of between 20-40 mm,
a channel leg having a width of 4.2 mm,
a channel leg thickness of between 3.8 mm, or
a thickness of metal goods between channel and molding cavity of 4.0 mm.

Alternatively, in case that the at least one tempering medium channel is obtained by machining a mold plate or mold half already having conventional straight cooling bores said thickness may be about less than or equal to 95% of the overall thickness of the respective mold plate, optionally less. Although about only 5% of the overall thickness of the mold plate or mold half is removed the possibility of the combined action of the existing conventional cooling line, optionally also used as heating lines, together with the new surface tempering medium channels speed up production rate by enabling faster tempering of mold parts.

The present invention also relates to an injection molding tool comprising the injection mold defined above,
a first sealing plate sealingly securable to the second injector mold plate face, and/or
a second sealing plate sealingly securable to the second ejector mold plate face.

When the sealing plates are clamped to a respective second mold plate face the at least one closed tempering medium channel is formed to define the flow path for guided circulation of the tempering medium, as occasion requires, including circulation of cold tempering medium for solidification of injected plastic material in order to allow for ejection at the end of the injection cycle, and/or circulation of hot tempering medium during injection of the plastic material and flowing of the plastic material into any corner and holes of the mold cavities, and for preparing the mold plates for a subsequent injection cycle.

Heating the mold cavities to the process temperature of the plastic material enables the use of very low injection pressure, thus drastically lowering the demands for strength and rigidity of the mold plates, which in turn open up for all-out employment of the tempering channels scheme described here.

In the injection molding tool according to the present invention the first sealing plate can be the stationary platen of an injection molding machine and/or the second sealing plate can be the moveable platen of the injection molding machine.

In an alternative embodiment of the injection molding tool according to the present invention the first sealing plate can include an extra first clamping plate inserted between the stationary platen and the injector mold plate. The second sealing plate can include an extra second clamping plate inserted between the moveable platen and the ejector mold plate. The clamping plates are arranged towards the respective stationary and moveable platens.

A first insulation plate may also be disposed on the first sealing plate facing the second injector mold plate face, and/or a second insulation plate can be disposed on the second sealing plate facing the second ejector mold plate face. The insulation plates serve to keep control of the direction of flow of thermal energy and to avoid unintended diversion and dissipation of thermal energy. Thus an insulation plate may help keeping the heat from a heated tempering medium directed towards a mold plate.

The present invention further relates to an injection molding machinery comprising the injection mold defined above.

The injection molding machinery comprises
at least one source of a tempering medium, and
a circulation arrangement with a valve system for controlling circulation of the tempering medium from the at least one source of tempering medium via a temperature adjusting system through the at least one tempering medium channel of the injection mold.

The present invention also relates to a method of retrofitting the injection molding machinery defined above by inserting the above defined injection mold and connecting said injection mold to the circulation arrangement and the source of tempering medium.

An injection molding machinery modified with the inventive injection mold enables an operator to adapt the injection mold to a new purpose or need without substantial efforts. The tempering medium channel of the injection mold is simply emptied of tempering medium, the injector mold plate and the ejector mold plate are separated from the plate to which they are secured, the new mold halves are mounted to these plates, and the circulation of tempering medium is re-established.

Injection molded objects obtained using the above described injection mold are also claimed.

In a particular expedient embodiment according to the present invention the same tempering medium channel of the injector plate or the ejector plate, respectively, of the injection mold defined above, is used for in turns circulating a heating medium and a cooling medium during an injection molding cycle. Thus different channels are not provided for cooling and heating media.

The inventive way of tempering an injection mold as defined in the present invention can e.g. be utilized in the method for injection molding plastic part(s) disclosed in applicants co-pending European patent application no. 13191336.0 and subsequent International patent application no. PCT/EP2014/073688 having the title "A method for injection molding plastic parts by means of an injection molding machine" filed 4 Nov. 2014. The corresponding US application has application Ser No. 15/139,932 and is filed of even date herewith. The method of that application comprises the steps of:

(a) fitting an injection molding machine with the injection mold according to the present invention,
(b) providing a feed of plastic material having a first temperature within the processing window of the plastic material,
(c) heating at least the one or more mold cavities to a second temperature within the processing window of the plastic material and maintaining the injection mold in closed condition at said second temperature by circulating through the at least one tempering medium channel a tempering medium having a third temperature,
(d) injecting plastic material having the first temperature into the closed heated injection mold to fill the one or more molding cavities,
(e) cooling at least the one or more mold cavities of the filled closed injection mold to a fourth temperature below the first temperature until at least partly solidification of the molded plastic part(s) inside the injection mold by circulating through the at least one tempering medium channel a tempering medium having a fifth temperature, opening the injection mold by parting the injector mold plate from the ejector mold plate,
(g) ejecting the at least partly solidified molded plastic part(s) by actuation of ejector pins of the ejector assembly, and
(h) repeating the cycle of steps (c)-(g) until the desired number of plastic parts is produced.

The injection of melted plastic material is made at an injection pressure of less than 200 kg/m², preferably less than 100 kg/m², preferably less than 80 kg/cm², more preferred less than 60 kg/cm², and even more preferred at an injection pressure of between 20-50 kg/cm². Any clamping force keeping the moveable mold platen and the stationary injection platen together while injecting plastic material, will easily keep the whole stack of plates, seals, etc. of the present innovation, clamped together in a thermal fluid-wise highly sealed relationship. In this way the risk of leakage of tempering medium between the second plate face and an opposite contacting plate, irrespective of which plate is the opposite plate, will be further reduced.

Conventional injection molding methods require an injection pressure of 600-700 kg/cm², which is about 15-30 times higher and therefore more expensive, require more energy, and causes earlier onset of wear of injection mold and injection mold machine parts.

Within the context of the present application the terms "processing window" or "processing window of a plastic material" can be used interchangeably and are to be understood as the temperature interval ranging from onset of glass transition until the start of degradation of the plastic material. The "processing window" or "processing window of a plastic material" includes the melting temperature of a plastic material and the glass transition temperature interval. The "processing window" or "processing window of a plastic material" differs from plastic material to plastic material, and providers and suppliers of plastic material provide datasheets with information of said "window".

A preferred temperature within the processing window is the "processing temperature" of the plastic material, which is the temperature interval which each manufacturer recommends for working with the plastic material before entering the cavity. When injection moulding, the temperature of the plastic material typically is in this interval when exiting the nozzle of the heating feed screw of the injection moulding machine. Notably the interval is not set by the onset of glass transition or melting, but is lower than the start of degradation of the material.

BRIEF DESCRIPTION OF THE INVENTION

Figure 2:
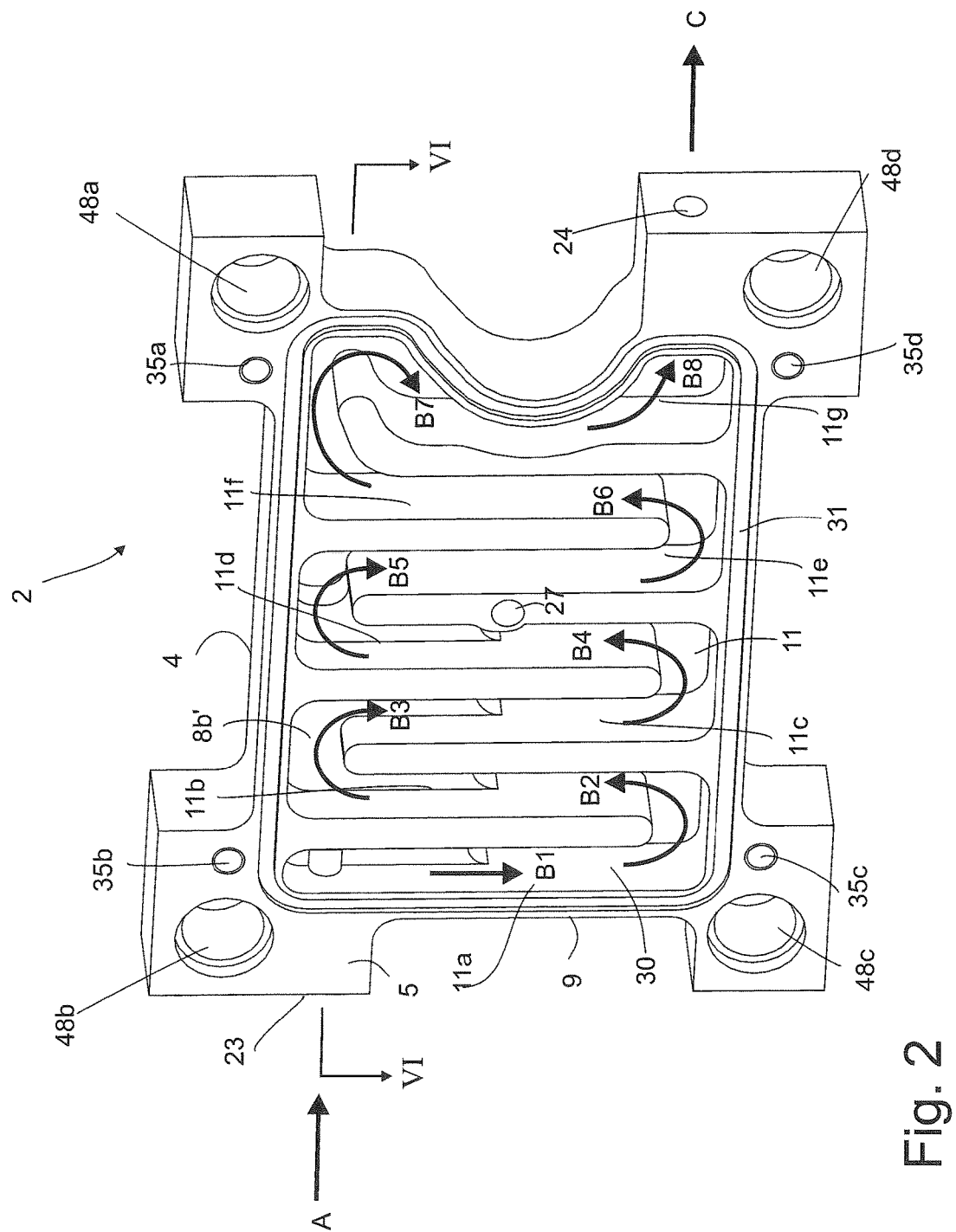
Figure 3:
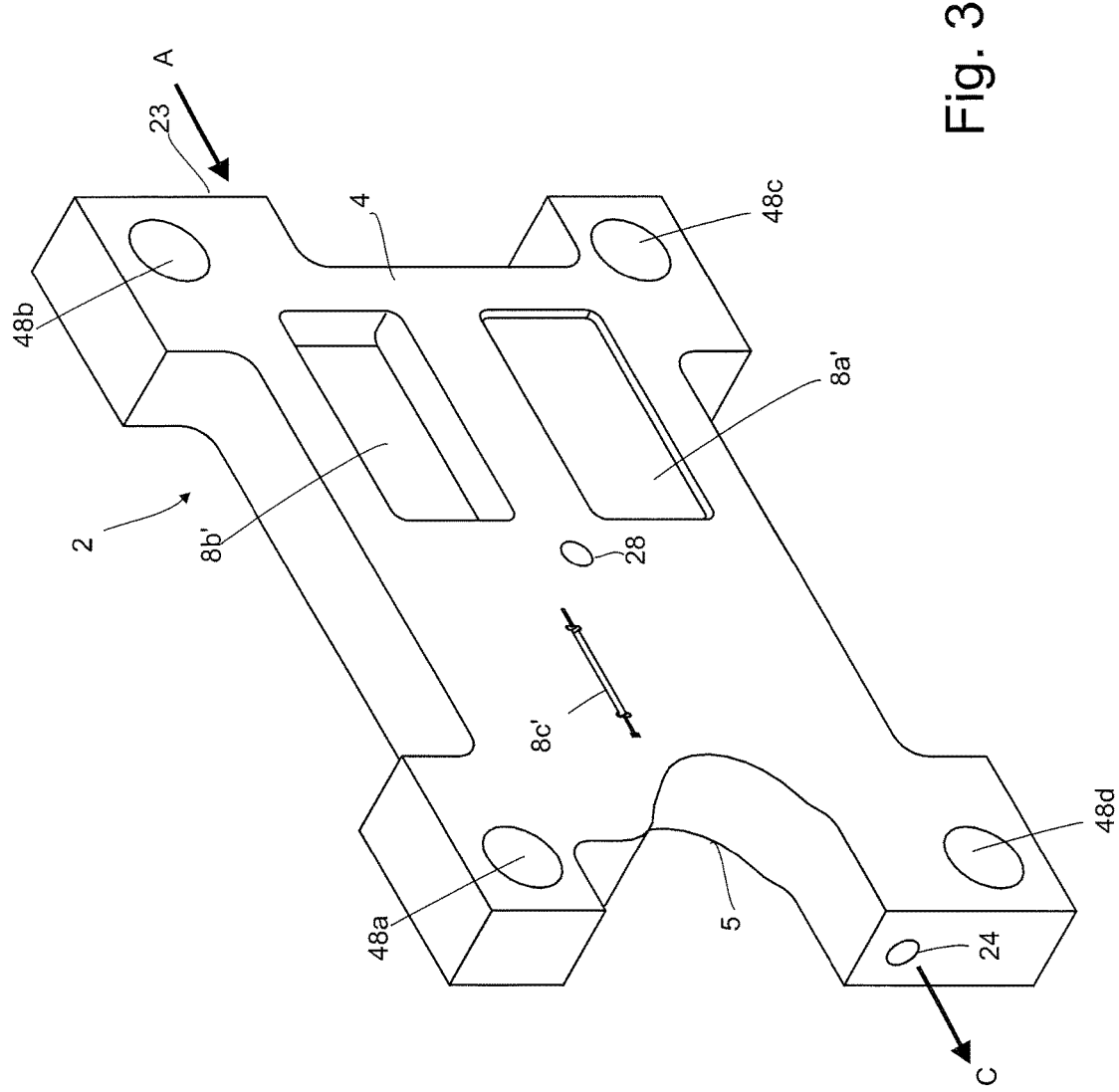
Figure 4:
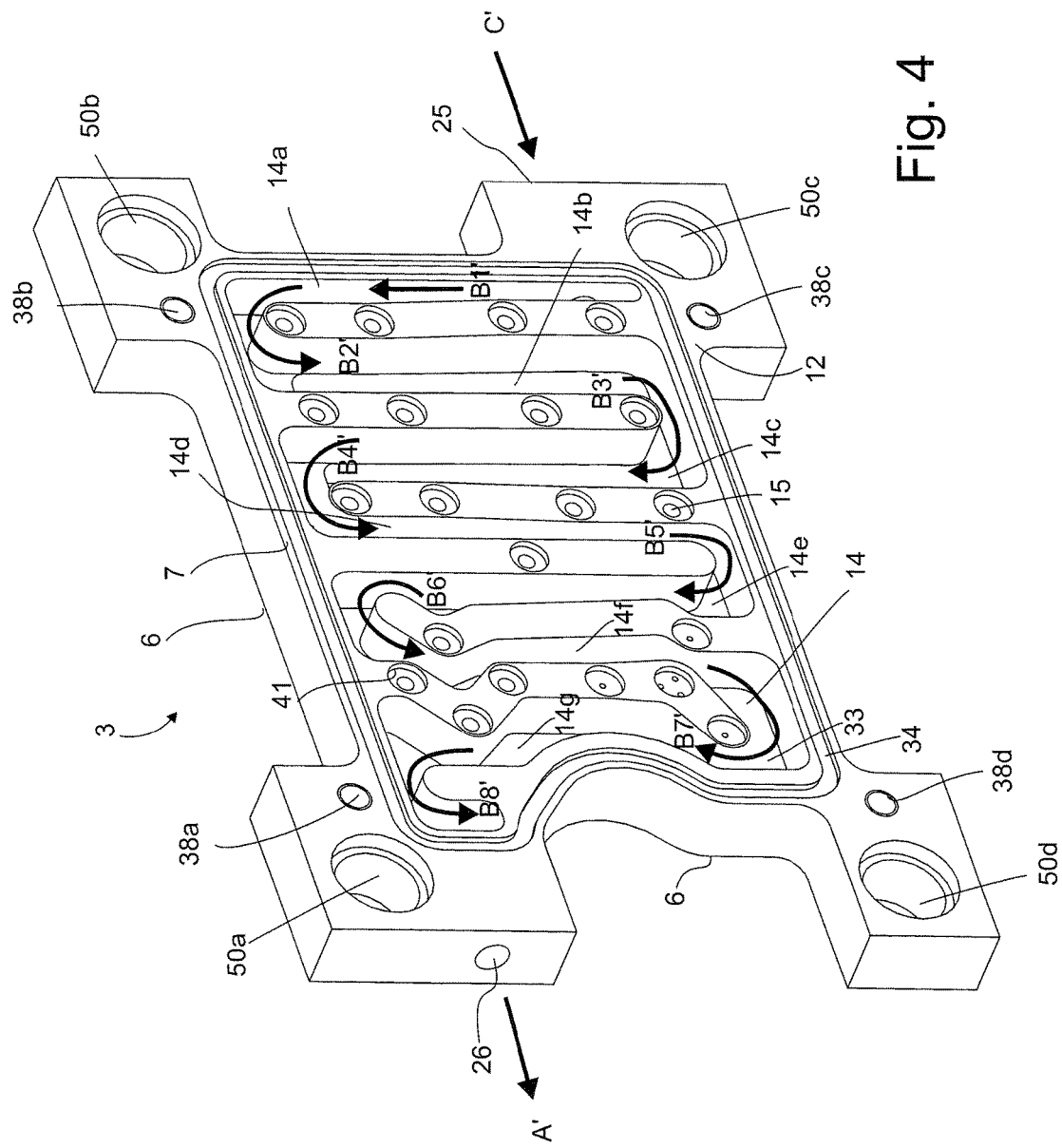
Figure 5:
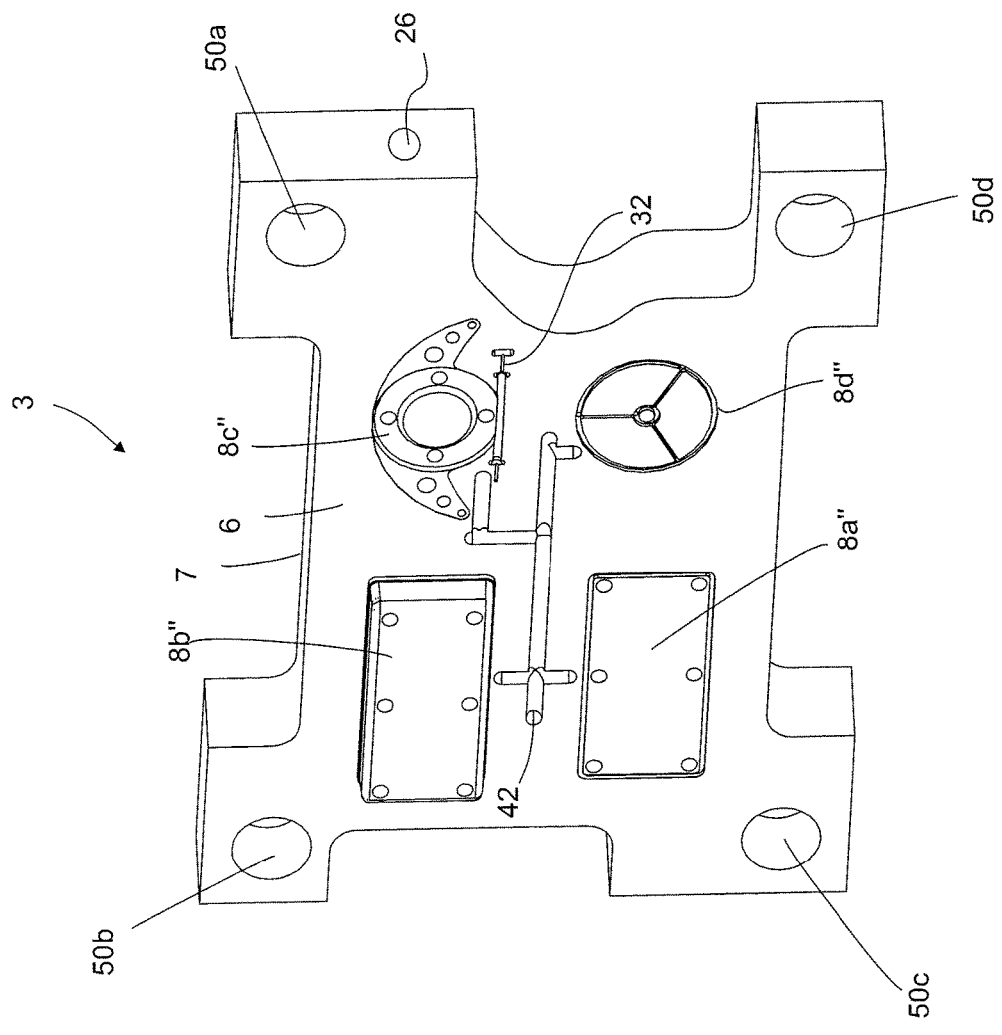
Figure 6:
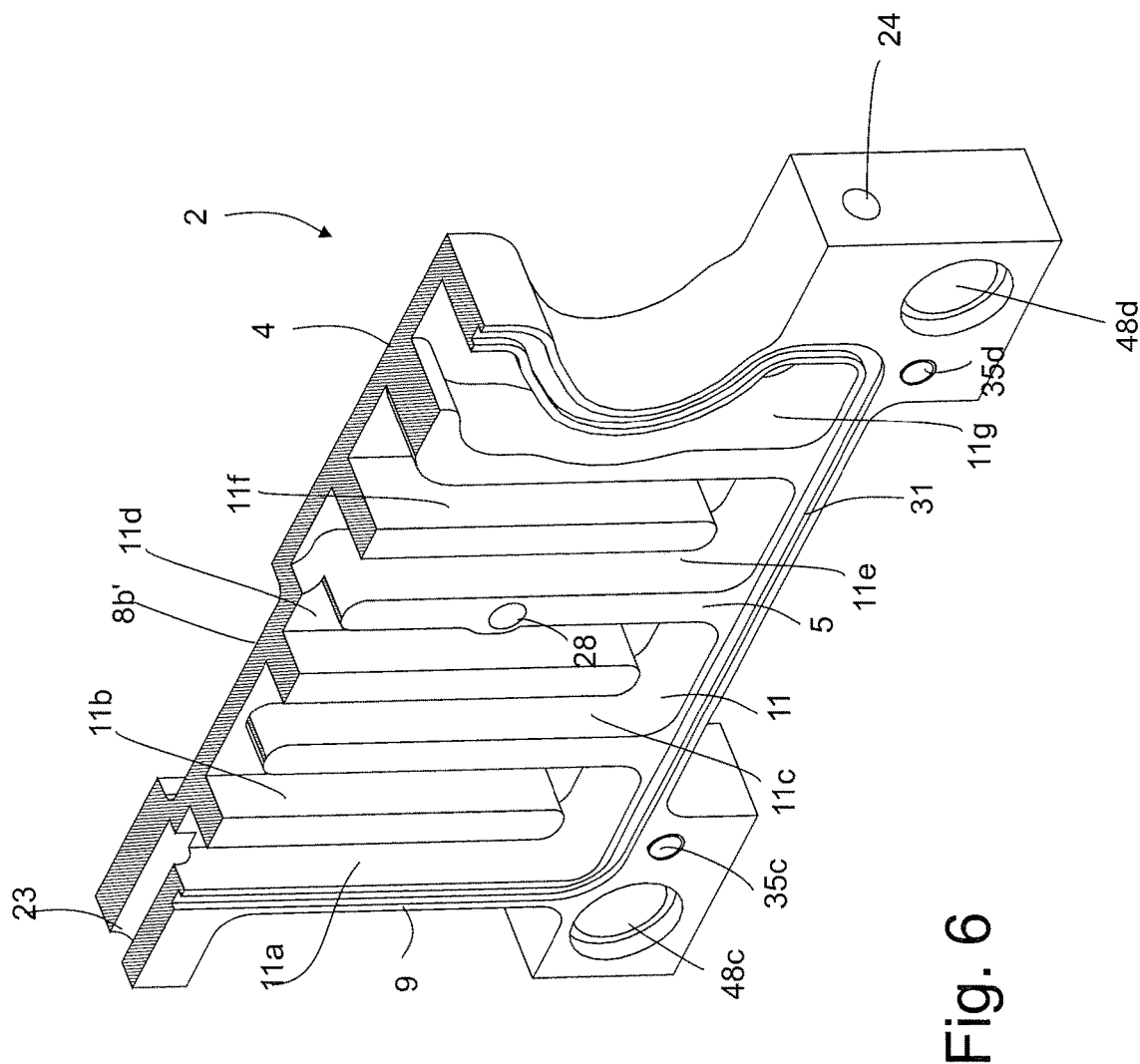
Figure 7:
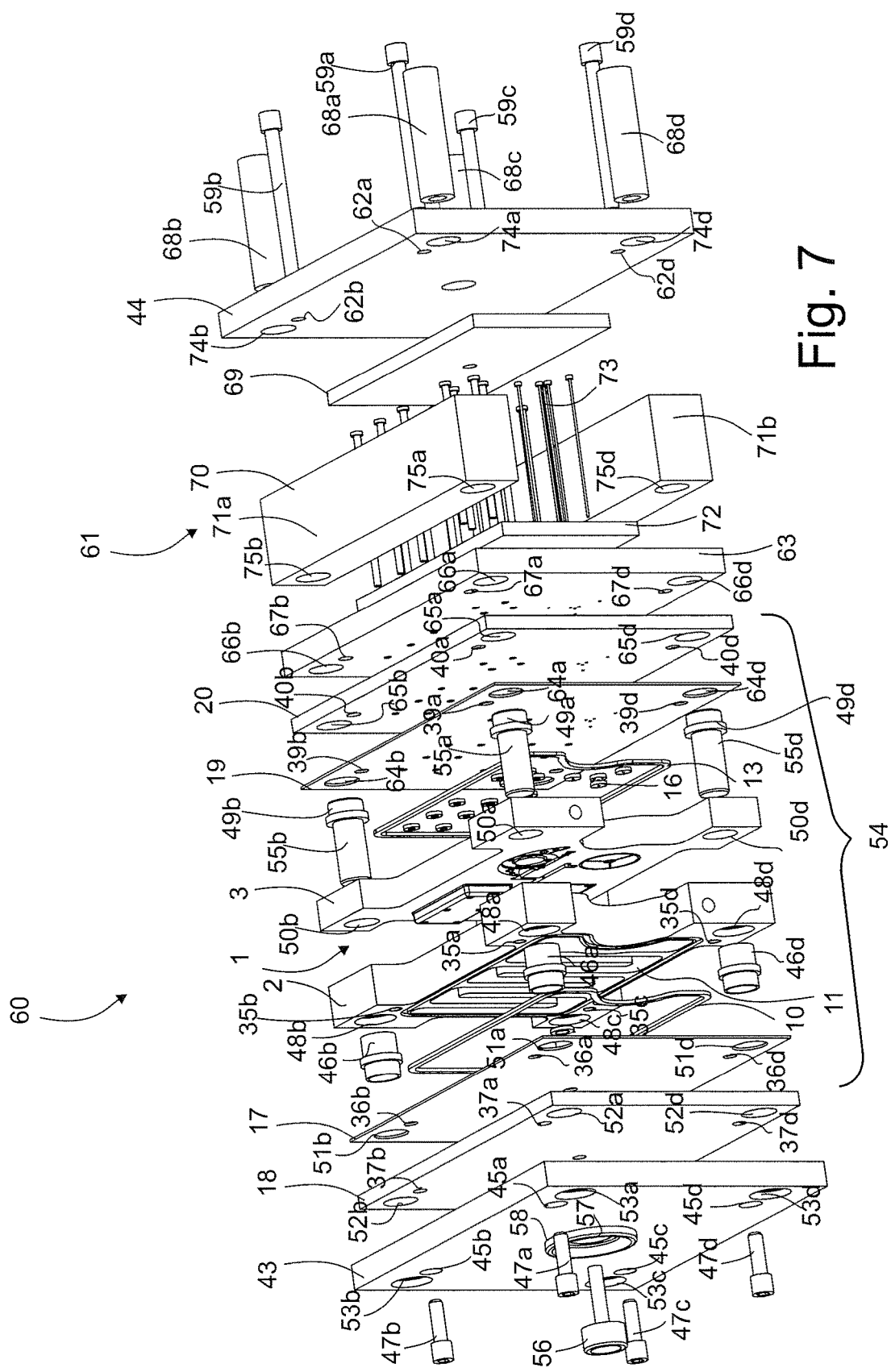

The invention will be described below in further details with reference to the drawing in which, FIG. 1 is a perspective exploded view of the plates and components of an injection molding tool seen from the first face of the ejector mold plate, oblique from above, FIG. 2 is a perspective view of the injector mold plate seen from the second mold face, FIG. 3 shows the same seen from the first mold face, FIG. 4 is a perspective view of the ejector mold plate seen from the second mold face, FIG. 5 shows the same seen from the first mold face, with exemplary cores protruding from the first face, and a detachable core embedded in parallel to the first face, FIG. 6 is a longitudinal sectional view taken along line VI-VI in FIG. 2, and FIG. 7 is a perspective exploded view of the components of an injection molding tool in a clamping unit seen from the stationary platen, oblique from above.

DETAILED DESCRIPTION OF THE INVENTION

The invention is described below by way of an exemplary embodiment. Dimensions of plates, design and number of mold cavities and corresponding cores, design of tempering medium channels, including their curvatures, lengths, depths, inlet point(s) and outlet point(s), gates, etc., can vary within the scope of the appended claims, and the figures should not be construed as limiting the present invention.

The ejector mold plate and the injector mold plate may be tempered by each their individual tempering channel and cycle, wherein the tempering medium cycles from the outlet of a respective plate back to e.g. the tempering medium source, which source are kept at a selected temperature. Alternatively the tempering medium channels of the plate can be in series or in parallel in the same tempering cycle, so that both plates are worked with tempering medium, such as the same tempering medium, at the same time.

FIG. 1 is a perspective exploded view of the plates of an exemplary tool 54 seen from the first face of the ejector mold plate, oblique from the top. The injection molding tool 54 is in FIG. 1 illustrated purely for illustrative purposes without ejector assembly, guide system, coupling nuts or screws, injection means, such as nozzle, and tempering system other than the tempering medium channels, etc. Such means are conventional and well known to the person skilled in the art of injection molding. It should however be understood that such operating means, fastening means, drive means, etc. are foreseen to operate the tool 54. In the shown embodiment both the injector mold plate and the ejector mold plate have tempering medium channels, however embodiments wherein just one of the plates has tempering medium channels are also foreseen. One plate may have one or more separate tempering medium channels, in particular in case of large plates, to reduce overall circulation time.

The injection mold 1 of the injection molding tool 54 includes an injector mold plate 2 and an ejector mold plate 3.

The injector mold plate 2 has a first injector mold plate face 4 and an opposite second injector mold plate face 5. The ejector mold plate 3 has a first ejector mold plate face 6 and an opposite second ejector mold plate face 7. The first injector mold plate face 4 faces towards the first ejector mold plate face 6, so as to define and delimit mold cavities 8a,8b,8c,8d when the injection mold is in closed condition. The mold cavities 8a,8b,8c,8d are composed by the first mold cavities halves 8a',8b',8c' formed in the first injector mold plate face 4 of the injector mold plate 2 and complementary second mold cavities halves 8a",8b",8c",8d" (not visible in FIG. 1) formed in the first ejector mold plate face 6 of the ejector mold plate 3, as will be described later with references to FIGS. 3 and 5.

As seen better in FIG. 2 the second injector mold plate face 5 has a first peripheral area 9 with a first seal 10 encircling at least one first tempering medium channel 11.

The second ejector mold plate face 7 of the ejector mold plate 3 has a second peripheral area 12 with a second seal 13 encircling at least one second tempering medium channel 14.

The ejector mold plate 3 has a plurality of traverse passages 15 for ejector pins (not shown), and the traverse passages 15 for the ejector pins (not shown) has passage seals 16 to prevent leakage of tempering medium from the second tempering medium channel 14 when ejector pins reciprocate to eject a molded plastic part.

A first sealing plate 17 is provided in relation to the second injector mold plate face 5 of the injector mold plate 2 to press the first seal 10 against said second injector mold plate face 5, so as to further avoid leakage of tempering medium via e.g. the first peripheral area 9. A first insulation plate 18 is also secured to the second injector mold plate face 5 of the injector mold plate 2, sandwiching the first sealing plate 17 and the first seal 10 in-between.

In a similar manner a second sealing plate 19 is provided on the second ejector mold plate face 7 of the ejector mold plate 3 to press the second seal 13 and the passage seals 16 against said second ejector mold plate face 7, so as to further avoid leakage of tempering medium via e.g. the second peripheral area 12. The second sealing plate 19, the second seal 13, and the passage seals 16 are sandwiched between a second insulation plate 20 and the second ejector mold plate face 7 of the ejector mold plate 3.

The second sealing plate 19 has a first set of ejector pin holes 21 and the second insulation plate 20 has a second set of injector pin holes 22. The first set of ejector pin holes 21, the second set of injector pin holes 22, and the traverse passages 15 of the ejector mold plate 3 are axially aligned to allow the smooth reciprocating of the injector pins required to eject a molded plastic part after cooling by means of a tempering medium.

The injector mold plate 2 has a first tempering medium inlet 23 and a first tempering medium outlet 24 (not visible in FIG. 1), both in communication with the first tempering medium channel 11. The ejector mold plate 3 has a second tempering medium inlet 25 and a second tempering medium outlet 26 (not visible in FIG. 1), both in communication with the second tempering medium channel 14. Said inlets 23,25 and outlets 24,26 are in the present embodiment provided in a short edge of the respective plate 2,3 wherefrom inlets and outlets are easily accessible. The location of inlets and outlets can be any other appropriate place, including another edge. Inlets and outlets are short holes in the solid edge of a plate and the inlets and outlets are the only drilling that needs to be made in a plate. Inlets and outlets open into the respective first and second tempering medium channels 11,14, which prior to being mounted in the tool 54 are open along their lengths.

The injector mold plate 2 has an injection gate 27 for entry, by injection, of melt of plastic material in the closed injection mold 1. Also, the first sealing plate 17 has a first hole 28 and the insulation plate has a second hole 29, which first hole 28 and second hole 29 are axially aligned/alignable with the injection gate 27 to provide for unobstructed injection of melt of plastic material. First (blind) mounting holes 35a,35b,35c,35d (not visible in FIG. 1) are provided in each corner of the injector mold plate 2 via its second injector mold plate face 5. The first mounting holes 35a, 35b,35c,35d are aligned with second through-going mounting holes 36a,36b,36c,36d in the corners of the first sealing plate 17 and with third through-going mounting holes 37a, 37b,37c,37d in the corners of the first insulation plate 18, which three sets of aligned mounting holes are used to securely but detachably clamp the injector mold plate 2, the first sealing plate 17 and the first insulation plate 18 tight together using suitable means such as bolts, e.g. screw bolts, see FIG. 7, to be able to operate the injection mold 1 as an integral coherent tight unit.

In a similarly manner in each corner the ejector mold plate 3 has fourth (blind) mounting holes 38a,38b,38c,38d via its second ejector mold plate face 7. The fourth mounting holes 38a,38b,38c,38d are aligned with fifth through-going mounting holes 39a,39b,39c,39d in the corners of the second sealing plate 19 and with sixth through-going mounting holes 40a,40b,40c,40d in the corners of the second insulation plate 20.

The injection gate 27 communicates with the mold cavities 8a,8b,8c,8d defined by mold cavities halves 8a',8b',8c', 8d'; 8a",8b",8c",8d" via runners, as will be explained further with reference to FIG. 5.

The first insulation plate 18 and the second insulation plate 20 help to control dissipation of thermal energy and prevent thermal energy from passing into an stationary platen or the moveable platen of the injection molding machine, respectively.

Bars, return rods, and holes for same, etc., needed for the opening and closing of the injection mold during a cycle, e.g. are as for conventional injection molds and injection molding tools, and will be briefly discussed later in relation to FIG. 7.

The inventive designs of the injector mold plate 2 and the ejector mold plate 3 will now be described in greater detail below.

In FIG. 2 the injector mold plate 2 is seen from the second injector mold plate face 5 and oblique from the short edge having the first tempering medium outlet 24. The first tempering medium channel 11 has a first free opening 30 along its length that defines the flow path, a zig-zag chicane having some parallel flow path legs delimited by channel walls. The chicane is encircled by the first seal 10, shown in FIG. 1. The first peripheral area 9 that encircles the first tempering medium channel 11 and the first seal 10 has a first recess 31 for receiving the first seal 10 to keep this first seal 10 in fixed position when the first sealing plate 17 and the first insulation plate 18 are assembled with the injector mold plate 2 to close the first free opening 30 and create the closed first tempering medium channel 11 for circulation of a hot or cold tempering medium from a source of first tempering medium, said first tempering medium being the same or different for cooling or heating respectively. Preferably the second temperature of the first tempering medium are about 20° C. higher that the first temperature of the melt plastic material.

The first tempering medium is supplied to the injector mold plate 2 via the first tempering medium inlet 23, as indicated by the arrow A. Then the first tempering medium flows, as indicated by the arrows B1, B2, B3, B4, B5, B6, B7, B8, along the curvature of the adjacent first leg 11a, second leg 11b, third leg 11c, fourth leg 11d, fifth leg 11e, sixth leg 11f, and seventh leg 11g of the zig-zag chicane of the first tempering medium channel 11 above the one or more mold cavities 8a'8b',8c' until the first tempering medium exists via the first tempering medium outlet 24, as indicated by arrow C, and reverts to the relevant source for heat exchange and/or tempering before taking part in a subsequent tempering cycle. The first tempering medium is, due to the design, including curvature, length and different depths in view of position of mold cavities of the first tempering medium channel 11, able to sweep a very large area of the injector mold plate 2 in proximity to the one or more mold cavities 8a',8b'8c' seen in FIG. 3. This sweeping is impossible with just conventional straight bores, such as drilled holes, as cooling channels. Residence time of the first tempering medium in the first tempering medium channel 11 is easily adjusted, e.g. by controlling the speed, start and stop regime, or other alternatives. Due to the large area being swept above the melt inside the mold cavities heat exchange by means of the first tempering medium is fast and effective and substantially uniform. Just a few cycles of first tempering medium may even suffice for one injection molding cycle. This way the injector mold plate 2 has been given a unique and versatile, easily adjustable tempering system of its own.

The injection mold 1 is preferably kept heated by a tempering medium during injection, and cooled by a tempering medium prior to and at least until beginning of opening the injection mold 1 for ejection of the molded part (not shown). Alternate heating and cooling of each or both the injector mold plate 2 and the ejector mold plate 3 need not take place simultaneously although this may often be the case. E.g. as soon as the injector mold plate 2 and the ejector mold plate 3 are parted to initiate ejection of the cooled molded part, heating of the injector mold plate can start anew to prepare the injector mold plate 2 for the next molding cycle. Avoidance of premature solidification of melt is easily contemplated due to tempering medium flowing through the tempering medium channels, which facilitates running of low viscosity melt to completely fill the one or more mold cavities of the closed mold. The affordable rapid thermal management according to the present invention of mold plates and mold cavities facilitates cooling and heating of both the injector mold plate 2 and the ejector mold plate 3 so as to easier adapt and follow an empirical thermal management scheme and/or a time schedule established theoretically or established just by doing tests and trials to obtain molded plastic parts of high quality. The thermal cycling in accordance with the present invention also supports and improves the alternate cooling and heating to perfect molded plastic parts, such as thin molded plastic parts, e.g. molded plastic parts having wall thickness of less than 1 mm, or enabling complicated molded plastic parts, which would have been almost impossible to make in a cost-efficient manner with conventional injection molding.

FIG. 3 shows the injector mold plate 2 from the first injector mold plate face 4, with the first tempering medium outlet 24 located in bottom left corner.

Two rectangular depressions 8a',8b' are provided, e.g. by machining, in the first injector mold plate face 4 of the injector mold plate 2 to serve as first mold cavities halves 8a',8b'. A third depression 8c' is provided as yet a first mold cavity half 8c' and serves for inserting a detachable separate tool core 32 from the side of the injector mold plate 2 to create a mold part with a long traverse hole. In the situation shown in FIG. 3 the tool core 32 is not yet positioned in its respective section of the mold cavity 8c' and reference number 32 is merely used to indicate the intended position of the core.

FIG. 4 shows the ejector mold plate 3 seen from the second ejector mold plate face 7 and oblique from the short edge having the second tempering medium outlet 26. The second tempering medium channel 14 has a second free opening 33 along its length that defines the flow path, a zig-zag chicane, encircled by the second seal 13 shown in FIG. 1. The second peripheral area 12 that encircles the second tempering medium channel 14 has a second recess 34 for receiving the second seal 13 to keep this second seal 13 in fixed position when the second sealing plate 19 and the second insulation plate 20 are assembled with the ejector mold plate 3 to close the second free opening 33 and create a closed second tempering medium channel 14 for circulation of a hot or cold tempering medium from a source of second tempering medium, said second tempering medium being same or different from the first tempering medium, and said second tempering medium being the same or different for cooling or heating, respectively.

The second tempering medium channel 14 is made similar to the first tempering medium channel 11 and also designed to allow flow of tempering medium through the adjacent legs of the chicane between the second tempering medium inlet 25, as indicated by arrow C', and the second tempering medium outlet 26, as indicated by arrow A', thus along the path from the second tempering medium inlet 25 via an eighth leg 14a, a ninth leg 14b, a tenth leg 14c, an eleventh leg 14d, a twelfth leg 14e, a thirteenth leg 14f and a fourteenth leg 14g of the chicane, as indicated by subsequent arrows, B1', B2', B3', B4, B5', B6', B7', B8'. The plurality of traverse passages 15 for ejector pins are provided in the goods of the ejector mold plate 3 between the eighth leg 14a, the ninth leg 14b, the tenth leg 14c, the eleventh leg 14d, the twelfth leg 14e, the thirteenth leg 14f and the fourteenth leg 14g of the chicane. Each traverse passage 15 is encircled by a recess 41 in the second ejector mold plate face 7 of the ejector mold plate 3 to create a suitable shaped space and bed for a corresponding passage seal 16, such as an O-ring, so that when the ejector pins (not shown) reciprocate no leakage of thermal fluid occurs. The recess 41 extends from the second ejector mold plate face 7 of the ejector mold plate 3 a small distance inside the ejector mold plate 3.

FIG. 5 shows the ejector mold plate 3 from the first ejector mold plate face 6 to illustrate the different second mold cavity halves 8a", 8b", 8c", 8d". A runner system 42, e.g. a runner system heated by using just the second tempering medium channel 14 and/or induction heating, connects mold cavities 8a,8b,8c,8d with a nozzle (not shown) at the injection gate 27, shown in FIG. 2 to distribute a melt, e.g. hot thermoplastic material, fast to the injection mold 1. Preferably the injection mold 1 is in a heated stage, in accordance with applicant's method as described in European patent application no. 13191336.0 and subsequent International patent application no. PCT/EP2014/073688. Second mold cavity halves 8a" and 8b" are the protruding cores, thus patrices, for mating with opposite cavities, thus matrices, in form of the first mold cavity halves 8a' and 8b' to create a molded plastic part having a three-dimensional shape defined by the gap between said patrix and said matrix when the injection mold is closed.

The benefits of using the injection mold 1 with the unique tempering system for e.g. molding thermoplastic parts are a.o. mold parts with no visible floating lines, no meeting lines in the mold parts behind tool cores, no tension in plastic parts, possibility to make extremely thin walls, free choice of where to place in-molding (injection) point, possibility to have long thin tool cores with only one end fixation (or two), centerline-asymmetric cavities possible without gasping/leaking tools, possibility to have off-centre or adjustable injection gate in injection mold, circular tube-formed parts will be circular whereas infallibly all tube-formed parts will be partly oval in conventional injection molding, box-shaped plastic mold parts will not have their walls shrink-bending inwards towards the centre of the box, and equal shrink fraction in all directions, i.e. isotropic shrinking.

If the injection mold 1 according to the invention, thus with the novel design of tempering channels, tempering system and tempering method, is used in the method of European patent application no. 13191336.0 and subsequent International patent application no. PCT/EP2014/073688 it is possible to make the injection molding tool, in particular the injection mold, much smaller than conventional injection molds and injection molding tools, with the immediate benefit that costs typically can be just about 50% of these. Moreover plastic raw material is not wasted like in conventional injection molding, thus it is estimated that 20% less plastic material is used.

Compared to conventional injection molds the injection mold according to the present invention is smaller, lighter, requires low power and minimum locking force, thus making the injection mold typically 70% cheaper in operation. Nor is there a need for rapid and high-pressure forced injection.

The first and the second tempering medium can be the same medium being thermally adjusted to predetermined temperatures by being circulated through a heat exchanger. The amount of tempering medium in circulation is thus substantially constant in some embodiments.

FIG. 6 is a section taken along line VI-VI in FIG. 2. The first tempering medium channel 11 has seven substantially parallel legs 11a,11b,11c,11d,11e,11f,11g. A first leg 11a is in communication with the first tempering medium inlet 23 for the first tempering medium and passes via the subsequent second leg 11b, the third leg 11c, the fourth leg 11d, the fifth leg 11e, the sixth leg 11f, and the seventh leg 11g out via the first tempering medium outlet 24. During its passing of the legs the first tempering medium exchanges thermal energy with the material of the injector mold 1 and with the plastic material of the plastic parts inside the one or more cavities. As is clear from the sectional view of FIG. 6 the second cavity 8b' is tempered by tempering medium passing through the first leg 11a, the second leg 11b and the third leg 11c of the first tempering medium channel 11. The first leg 11a, the second leg 11b and the third leg 11c of the first tempering medium channel 11 have a different depth, in the present case a smaller depth, because of the depth of the cavity 8a', than the fourth leg 11d, the fifth leg 11e, the sixth leg 11f, and the seventh leg 11g, so that the distance the thermal energy must traverse during heat exchange between first tempering medium and plastic material inside a cavity approximates each other, to any extent possible.

Thus the distance between the bottom of a tempering medium channel 11,14 and the bottom of a mold cavity can to a much higher degree than for conventional injection molds be kept substantially similar across the faces of the injector mold plate or ejector mold plate.

E.g. in case the first tempering medium channel 11 simply was a hole drilled from the first tempering medium inlet 23 or the tempering medium outlet 24 parallel to the second injector mold plate face 5, such a drilled hole cannot be made closer to the first injector mold plate face 4 than the cavities allow, because such a conventional hole must simply not open into a cavity. So thermal energy flux is extremely different from cavity to cavity in conventional injection molds whereas the depth of the first tempering medium channel 11 according to the present invention can be controlled and selected depending on the three dimensional shape and area of the subjacent cavity, nor need the first tempering medium channel 11 be straight as in most prior art or rely on turbulence and agitation as in other prior art, but can instead follow a well-defined flow path particular selected and suited for a particular task and tempering process. As is evident for the person skilled in the art these above advantages applies for the ejector mold plate 3 as well.

FIG. 7 shows the injection molding tool 54, including the above described first insulation plate 18, the first sealing plate 17, the first seal 10, the injector mold plate 2, the ejector mold plate 3, the second seal 13 with the passage seals 16, the second sealing plate 19, and the second insulation plate 20, in a clamping unit 60 with an ejector assembly 61.

The injector mold plate 2 is the front half of the injection mold 1 to be secured to a stationary platen 43. The injector mold plate 2 aligns with a nozzle of an injection molding machine (not shown). The ejector mold plate 3 is the opposite rear half of the injection mold 1 to be secured to a moveable platen 44 and operatively connected to the ejector assembly 61.

The injector mold plate 2, the first sealing plate 17 and the first insulation plate 18 are secured to the stationary platen 43 by means of a set of first screws 47a,47b,47c,47d through aligned respective first mounting holes 35a,35b,35c,35d of the injector mold plate 2, the second mounting holes 36a, 36b,36c,36d of the first sealing plate 17, the third mounting holes 37a,37b,37c,37d of the first insulation plate 18, and first corner coupling holes 45a,45b,45c,45d of the stationary platen 43. This way it is ensured that these plates 2,17,18 and the stationary platen 43 are sufficiently firmly secured to each other to avoid detachment when subjected to an injection molding cycle and when subjected to the forces resulting from opening and closing of the injection mold 1, as well as to ensure leak-tight closing of the first tempering channel 11.

A set of hollow coupling sleeves 46a,46b,46c,46d has one end mounted in first sleeve coupling holes 48a,48b,48c,48d provided in the corners of the injector mold plate 2 and serves for coupling with male coupling plugs 49a,49b,49c, 49d of which one end is inserted in first plug coupling holes 50a,50b,50c,50d provided in the corners of the ejector mold plate 3. The opposite respective ends of the hollow coupling sleeves 46a,46b,46c,46d are mounted through aligned second sleeve coupling holes 51a,51b,51c,51d in the first sealing plate 17 and further through aligned third sleeve coupling holes 52a,52b,52c,52d of the first insulation plate 18 and fourth sleeve coupling holes 53a,53b,53c,53d of the stationary platen 43.

The hollow coupling sleeves 46a,46b,46c,46d engage with long ends 55a,55b,55c,55d of the male coupling plugs 49a,49b,49c49d to keep the injection mold 1 securely closed while the melted plastic material, that is injected by a nozzle (not shown) through an injection sprue bushing 56 of an injection gate 57 of the injector mold plate 2, subsequently cools. The injection sprue bushing 56 is kept secured in the injection gate by means of a locking and tightening ring 58.

In a similar manner the ejector mold plate 3, the second sealing plate 19 and the second insulation plate 20 are secured to a moveable plate 63 by means of a set of long second screws 59*a*,59*b*,59*c*,59*d* passing through second corner coupling holes 62*a*,62*b*,62*c*,62*d* of the moveable platen 44, and further through seventh mounting holes 67*a*,67*b*,67*c*,67*d* of the movable plate 63, the sixth mounting holes 40*a*,40*b*,40*c*,40*d* of the second insulation plate 20, the fifth mounting holes 39*a*,39*b*,39*c*,39*d* of the second sealing plate 19, and the fourth mounting holes 38*a*,38*b*,38*c*,38*d* of the ejector mold plate 3 to make sure that these plates and the moveable platen 44 are sufficiently firmly secured to each other to avoid detachment when subjected to an injection molding cycle, and thus to forces resulting from opening and closing the injection mold 1, as well as to ensure leak-tight closing of the second tempering channel 14.

The moveable plate 63 is secured to the second insulation plate 20 on the one side and to the ejector assembly 61 on the other side to provide for operation of said ejector assembly in relation to the injection mold 1.

The long ends 55*a*,55*b*,55*c*,55*d* of the male coupling plugs 49*a*,49*b*,49*c*,49*d* protrude past the first plug coupling holes 50*a*,50*b*,50*c*,50*d* of the ejector mold plate 3 to engage inside the hollow coupling sleeves 46*a*,46*b*,46*c*,46*d*. The opposite short end of the male coupling plugs 49*a*,49*b*,49*c*, 49*d* are secured in second plug coupling holes 64*a*,64*b*,64*c*, 64*d* of the second sealing plate 19, aligned third plug coupling holes 65*a*,65*b*,65*c*,65*d* of the second insulation plate 20, and aligned fourth plug coupling holes 66*a*,66*b*, 66*c*,66*d* of the moveable plate 63. The moveable plate 63 is also secured to the second insulation plate 20, the second sealing plate 19 and the ejector mold plate 3 by means of the long second screws 59*a*,59*b*,59*c*,59*d* which passes through the seventh mounting holes 67*a*,67*b*,67*c*,67*d* aligned with corresponding mounting holes in the respective second insulation plate 20, the second sealing plate 19 and the ejector mold plate 3.

When the clamping unit 60 separates the injector mold plate 2 and the ejector mold plate 3, the ejector assembly 61 provided between the moveable platen 44 and the second insulation plate 19 is actuated to eject a solidified plastic part after circulation of a tempering medium at a selected temperature through the first tempering medium channel 11 and/or the second tempering medium channel 14.

The ejector assembly is conventional and is only described in general terms below.

Bars 68*a*,68*b*,68*c*,68*d* at the corners of the moveable platen 44 push a first ejector assembly plate 69 forward inside an ejector box 70. The injector box 70 includes two opposite distance blocks 71*a*,71*b* and a second ejector assembly plate 72 facing towards the moveable plate 63. Pushing the first ejector assembly plate 69 actuates pushing of ejector pins 73 towards the molded part so that the ejector pins 73 can push the solidified plastic part out of an open mold cavity located behind the ejector pins 73. The injector pins are provided in a number and a density dictated to eject the solidified plastic part without its deformation and without leaving noticeable ejector pin marks.

The bars 68*a*,68*b*,68*c*,68*d* pass through first ejector bar holes 74*a*,74*b*,74*c*,74*d* of the moveable platen 44 and through through-passages 75*a*,75*b*,75*c*,75*d* in opposite distance blocks 71*a*,71*b* and into the fourth plug coupling holes 66*a*,66*b*,66*c*,66*d* at the corners of the moveable plate 63.

By means of the injection mold 1 according to the present invention it has been made possible to mold plastic parts having complex shapes and fine details. Due to the unique design of the tempering channels, tempering, thus alternate heating and cooling of the injection mold during an injection cycle, can be controlled in the best possible way for many different cavities of same injection mold. This way physical properties of the final plastic parts are good.

The plastic parts obtained by the injection mold, including but not limited to using the method disclosed in applicant's above-mentioned co-pending European patent application no. 13191336.0, and subsequent International patent application no. PCT/EP2014/073688 have superior surface finish and extremely high dimensional accuracy.

The thermal management properties made possible by the present invention during injection molding are highly improved. Emphasize is made that the present invention preferably is used with the tempering method described in European patent application no. 13191336.0 and subsequent International patent application no. PCT/EP2014/073688. Nevertheless the present invention can be implemented in any injection molding machine. Since heat exchange is much more uniform for every section of a plastic part than for conventional injection molds, the plastic parts have substantially similar good physical properties across the entire plastic part unit. Production rate is high and tooling and equipment costs are low, in particular because the injection molds can be made smaller than conventional injection molds because the melt can be fed to a heated injection mold.

The present invention is suited for any simple or complex temperature regime. The thermal management channels, thus the tempering medium channels, contribute to making the separate innovation of thermal cycling technology of European patent application no. 13191336.0 and subsequent International patent application no. PCT/EP2014/073688 even simpler, cheaper, and better.

The tempering medium channels of a mold plate according to the present invention can be made as complex or simple as needed for a certain molding task. Designing the tempering medium channels is typically made based on the locations of the one or more mold cavities. Thus design of tempering medium channels does not take much time, can be made fast, at low costs, and by using simple, easily accessible equipment, based on knowledge of the mold cavities.

It should be understood that the present invention can be implemented in conventional molding, and the present invention is not limited to any specific thermal cycling technology. The tempering medium channels may even be made in an existing mold plate already provided with drilled holes for cooling purposes. Subsequently such redesigned mold plate can simply be fitted into the injection molding tool, thus coupled to a sealing plate and seal, as well as the valve system for cycling the tempering medium.

What is claimed is:

1. An injection mold comprising: an injector mold plate having a first injector mold plate face including first mold cavities halves of one or more first mold cavities and an opposite second injector mold plate face to be mounted to an injection molding tool, an ejector mold plate having a first ejector mold plate face including second mold cavities halves of one or more second mold cavities and an opposite second ejector mold plate face to be mounted to an injection molding tool, the first injector mold plate face faces towards the first ejector mold plate face to delimit the one or more of the first and second mold cavities when the injector mold plate and the ejector mold plate are in closed contact during injection of a plastic material, at least one tempering medium channel that connects at least a tempering medium inlet of the injection mold to a tempering medium outlet of the injection mold, the at least one tempering medium channel defining a flow path that runs above one or more of the one or more of the first and second mold cavities by traversing an area of the second injector mold plate face and of the second ejector mold plate face, the at least one tempering medium channel also defining a free opening in said respective second mold plate face, wherein each of the injector mold plate and the ejector mold plate comprises of the at least one tempering medium channel, wherein each of the tempering medium channel is configured as a single continuous chicane of tight turns defined by channel walls configured to minimize turbulence and has a lengthwise opening along its entire length, which opening becomes closed when the injection mold is mounted to an injection molding tool, a first sealing plate that is sealingly securable to the second injector mold plate face, a second sealing plate that is sealingly securable to the second ejector mold plate face, a first insulating plate that is disposed on the first sealing plate facing the second injector mold plate face, and a second insulating plate that is disposed on the second sealing plate facing the second ejector mold plate face, wherein the at least one tempering medium channel of the injector mold plate is closed by the first sealing plate and the at least one tempering medium channel of the ejector mold plate is closed by the second sealing plate when the injection mold is mounted in an injection molding machine that is configured to provide alternate heating and cooling to both the injector mold plate and the ejector mold plate during a molding cycle, wherein the injector mold plate, the first sealing plate, and the first insulation plate are detachably clamped tight together, and wherein the ejector mold plate, the second sealing plate, and the second insulation plate are detachably clamped tight together.

2. An injection mold according to claim 1, wherein the single continuous chicane of the each of the tempering medium channel extends from the tempering medium inlet to the tempering medium outlet, which single continuous chicane consists of a series of tight flow path turns separated by intermediate channel walls, at least some of the intermediate channel walls are parallel to obtain a turning of substantially 180°.

3. An injection mold according to claim 2, wherein the single continuous chicane that constitutes the free opening of the at least one tempering medium channel defines the flow path for circulation of the tempering medium across the respective injector mold plate and the ejector mold plate, the at least one tempering medium channel defines the flow path that is longer than a width of the respective injector mold plate and ejector mold plate, and/or a height of the respective injector mold plate and ejector mold plate, and/or any line from edge to edge or corner to corner of the respective injector mold plate and ejector mold plate.

4. An injection mold according to claim 1, wherein: the second injector mold plate face of the injector mold plate has a first peripheral area encircling the at least one tempering medium channel.

5. An injection mold according to claim 4, wherein the first peripheral area is provided with a first seal.

6. An injection mold according to claim 1, wherein the second ejector mold plate face of the ejector mold plate has a second peripheral area encircling the at least one tempering medium channel.

7. An injection mold according to claim 6, wherein the second peripheral area is provided with a second seal.

8. An injection mold according to claim 1, wherein the ejector mold plate has a plurality of traverse passages for ejector pins, and wherein each of the plurality of the traverse passages have a passage seal.

9. An injection mold according to claim 1, wherein the at least one tempering medium channel is obtained by machining a solid injector mold plate and a solid ejector mold plate.

10. An injection mold according to claim 1, wherein the at least one tempering medium channel is obtained by machining a solid injector mold plate and a solid ejector mold plate so that a thickness of metal goods of the solid injector mold plate and the solid ejector mold plate between a cavity and a tempering medium channel is less than 20 mm or less than 15 mm.

11. An injection mold according to claim 1, wherein the at least one tempering medium channel includes one or more features of: a channel leg turning radius between 6.0 mm-30 mm, a number of channel legs between 3-10, a channel leg having a length about 200 mm, a total length between 600 mm-800 mm, a depth between 20 mm-60 mm, a channel leg having a width between 3.0 mm-5.0 mm, a channel leg thickness between 3.5 mm-5.0 mm, or a thickness of metal goods between a channel leg and the one or more of the first and second mold cavities of 3.0 mm-5.5 mm.

12. An injection mold according to claim 1, wherein the at least one tempering medium channel includes one or more features of: a channel leg having a length of about 140 mm, five channel legs, a total length of 700 mm, a depth of between 20 mm-40 mm, a channel leg having a width of 4.2 mm, a channel leg thickness of 3.8 mm, or a thickness of metal goods between a channel leg and the one or more of the first and second mold cavities of 4.0 mm.

13. An injection mold according to claim 1, wherein the at least one tempering medium channel is obtained by machining the injector mold plate and the ejector mold plate or by machining a mold half already having straight cooling bores so that a thickness of metal goods of the injector mold plate and the ejector mold plate between a cavity and the at least one tempering medium channel is less than or equal to 95% of overall thickness of the respective injector mold plate and the ejector mold plate.

14. An injection mold according to claim 1, wherein the injection mold is adapted for injection of plastic material at an injection pressure of less than 100 kg/cm.

15. An injection molding tool comprising the injection mold according to claim 14, wherein the first sealing plate is a stationary platen of an injection molding machine and/or the second sealing plate is a moveable platen of the injection molding machine.

16. An injection molding machinery comprising an injection mold according to claim 1, wherein the injection molding machinery comprises at least one source of a tempering medium coupled to the respective injector mold plate and the ejector mold plate, and a circulation arrangement with a valve system for controlling circulation of the tempering medium from the at least one source of the tempering medium via a temperature adjusting system through the at least one tempering medium channel of the injection mold.

* * * * *